(12) United States Patent
Michioka et al.

(10) Patent No.: US 7,870,673 B2
(45) Date of Patent: Jan. 18, 2011

(54) METHOD OF MANUFACTURING A SPHERICAL BEARING

(75) Inventors: Hidekazu Michioka, Tokyo (JP); Tomozumi Murata, Tokyo (JP); Tetsuhiro Nishide, Tokyo (JP)

(73) Assignee: THK Co., Ltd., Tokyo (JP)

( * ) Notice: Subject to any disclaimer, the term of this patent is extended or adjusted under 35 U.S.C. 154(b) by 704 days.

(21) Appl. No.: 10/544,641

(22) PCT Filed: Apr. 15, 2004

(86) PCT No.: PCT/JP2004/005361

§ 371 (c)(1), (2), (4) Date: Aug. 5, 2005

(87) PCT Pub. No.: WO2004/092598

PCT Pub. Date: Oct. 28, 2004

(65) Prior Publication Data

US 2006/0150416 A1 Jul. 13, 2006

(30) Foreign Application Priority Data

Apr. 16, 2003 (JP) .............................. 2003-111319

(51) Int. Cl.
*B21K 1/04* (2006.01)

(52) U.S. Cl. ............................. 29/898.049; 29/898.043; 29/898.047; 29/899.048; 29/898.12

(58) Field of Classification Search ................... 29/898, 29/527.5, 898.043, 898.047, 898.048, 898.049, 29/898.05, 898.07, 898.12; 384/192, 202–204; 92/12

See application file for complete search history.

(56) References Cited

U.S. PATENT DOCUMENTS

| 3,085,312 A | 4/1963 | Evans |
| 3,570,090 A | 3/1971 | Teramachi |

(Continued)

FOREIGN PATENT DOCUMENTS

| GB | 2080 401 A | 2/1982 |

(Continued)

OTHER PUBLICATIONS

Human Translation JP48019940A Nunome Mar. 13, 1973.*

(Continued)

*Primary Examiner*—David P Bryant
*Assistant Examiner*—Ryan J Walters
(74) *Attorney, Agent, or Firm*—Westerman, Hattori, Daniels & Adrian, LLP

(57) ABSTRACT

Provided is a method of manufacturing a spherical bearing having an inside member with a metal ball portion and an outside member having a ball support portion enclosing and supporting the ball portion of the inside member and connected to the inside member swingably or rotatably relative to each other, including the steps of performing injection molding in which the ball portion of the inside member is inserted as a core in a mold to mold a resin liner covering the ball portion, molding the outside member covering the resin liner by a casting in which the ball portion and the resin liner are inserted as a core in the mold, and after the completion of the casting, heating the resin liner covering the ball portion through the ball portion of the inside member.

3 Claims, 6 Drawing Sheets

U.S. PATENT DOCUMENTS

| | | | |
|---|---|---|---|
| 4,079,490 A * | 3/1978 | McCloskey | 29/898.047 |
| 5,480,231 A | 1/1996 | Sasaki et al. | |
| 5,660,097 A * | 8/1997 | Nomura et al. | 92/12.2 |
| 6,098,287 A * | 8/2000 | Takahashi et al. | 29/898.043 |
| 6,941,656 B2 * | 9/2005 | Michioka et al. | 29/898.049 |
| 2001/0043767 A1 | 11/2001 | Michioka et al. | |
| 2002/0112351 A1 | 8/2002 | Michioka et al. | |

FOREIGN PATENT DOCUMENTS

| | | |
|---|---|---|
| JP | 45-19213 | 8/1970 |
| JP | 48-19940 | 3/1973 |
| JP | 50-44365 | 4/1975 |
| JP | 50-78749 | 6/1975 |
| JP | 50-20211 | 7/1975 |
| JP | 51-42569 B1 | 11/1976 |
| JP | 52-50452 | 4/1977 |
| JP | 52-050452 | 4/1977 |
| JP | 57-79320 | 5/1982 |
| JP | 63-188230 | 12/1988 |
| JP | 03-142212 | 6/1991 |
| JP | 3-142212 | 6/1991 |
| JP | 05-026225 | 2/1993 |
| JP | 5-26225 | 2/1993 |
| JP | 6-200931 | 7/1994 |
| JP | 06-200931 | 7/1994 |
| JP | 07-190066 | 7/1995 |
| JP | 2002-39159 | 2/2002 |

OTHER PUBLICATIONS

Human Translation JP52050452A Sumiyoshi Apr. 22, 1977.*
Translation of the International Preliminary Report on Patentability of International Application No. PCT/JP2004/005361 (Form PCT/IB/338) and Form PCT/IPEA/409.
European Search Report dated Sep. 25, 2006, Application No. 04727711.6-2424.

* cited by examiner

METHOD OF MANUFACTURING A SPHERICAL BEARING

TECHNICAL FIELD

The present invention relates to a spherical bearing in which an inside member having a ball portion serving as a center of the swing of a link mechanism and an outside member enclosing and holding the same are swingably or rotatably coupled to each other, and which is primarily used for a link motion mechanism or the like in a suspension arm part and a steering part of an automobile, a blade driving part of a combine, or the like.

BACKGROUND ART

In general, known spherical bearings of this type include bearings which are equipped with an inside member having a ball portion and an outside member enclosing and holding the ball portion of the inside member to be coupled to the inside member such that it can swing or rotate relative to the inside member. The outside member must undetachably enclose and hold the ball portion against any load acting on the inside member. Therefore, with such a spherical bearing, there remains a problem of what kind of structure to use for enclosing the ball portion in the outside member and for maintaining free swinging and rotary motions of the inside member and the outside member.

One known structure conventionally used for a spherical bearing is provided by preparing a metal casing as the outside member having a recess greater than the diameter of a ball portion and press-fitting the ball portion constituting the inside member enclosed in a self-lubricant resin sheet into the casing (JP A-57-79320, JP 63-188230 U, JP-A-05-26225, JP-A -07-190066, etc.). In this spherical bearing, since the resin sheet enclosing a ball portion is pressed between the ball portion and the casing to be subjected to elastic deformation, any gap between the ball portion and the resin sheet is eliminated to allow the ball portion to rotate in the casing without rattling. Further, since the ball portion is in slide contact with the resin sheet alone, there is no possibility of troubles such as biased wear of the ball portion even when the spherical bearing is used for a long time.

However, an outside member of this type, in which a resin sheet is sandwiched between a ball portion and a casing, has problems including difficulty in achieving smooth and light movement of a link mechanism that is configured using the spherical bearing because the resin sheet that is in contact with the ball portion in a compressed state makes the movement of the ball portion somewhat heavy. Another problem arises in that the resin sheet is likely to wear when it is used for a certain period of time because the resin sheet is in contact with the spherical surface of the ball portion under a pressure and in that the process of such wear is likely to cause rattling between the outside member and the ball portion. Further, still another problem arises in that the ball portion is likely to come off the outside member when a heavy load is applied to the spherical bearing because the resin sheet is elastically deformed under such a heavy load.

On the other hand, another structure for a spherical bearing is known in which an outside member is cast using a ball portion as a core to directly enclose the ball portion in the outside member (JP-A-48-019940). In this spherical bearing, the ball portion is first covered with a resin liner (with a thickness of approximately 0.5 mm) of low friction coefficient formed of fluororesin or the like, and is placed in the mold together with the resin liner, before the outside member is formed by die-casting of a zinc alloy or an aluminum alloy, the cast outside member enclosing and holding the ball portion through the intermediation of the resin liner. In this construction, it is possible to seal the ball portion in the outside member, with the gaps among the ball portion, the resin liner, and the outside member being completely eliminated; further, by selecting a self-lubricating material for the resin liner, it is advantageously possible to use the spherical bearing under no oiling condition.

However, when the outside member is thus die-cast using the ball portion covered with the resin liner as the core, the outside member after casting develops casting contraction, and tightens the ball portion through the resin liner. Thus, it has been impossible to freely rotate the ball portion relative to the outside member and the resin liner solely by casting the outside member.

In view of this, the spherical bearing as disclosed in JP-A-48-19940, after the die-casting of the outside member, an external force is applied to the outside member or the ball portion to cause the outside member to undergo plastic deformation, whereby a minute gap is formed between the ball portion and the resin liner, thereby securing free rotation of the ball portion.

However, to form a gap of an appropriate size between the ball portion and the resin liner, it is rather difficult to adjust the external force to be applied to the outside member or the ball portion. That is, when the external force is too small, a sufficient gap cannot be formed, and the ball portion and the outside member remain in close contact with each other, resulting in the movement of the ball portion relative to the outside member being rather heavy; on the other hand, when the external force is excessively large, the gap becomes too large, resulting in the ball portion rattling relative to the outside member. Further, even a slight rattling between the ball portion and the resin liner results in an increase in the gap between the ball portion and the resin liner due to a long-term use; thus, when, for example, the bearing is used in a link mechanism, it will be impossible to effect accurate transmission of motion or force between the inside member and the outside member.

Further, in a spherical bearing of this type, in order to prevent inadvertent swinging motion of the inside member relative to the outside member due to the action of slight vibration or the like, it would be convenient if it were possible to adjust to some extent the lightness of movement of the inside member with respect to the outside member, that is, the pre-load, according to use. However, in the method in which a gap is formed between the resin liner and the ball portion through plastic deformation of the outside member, it is difficult to effect fine adjustment on the size of this gap, which means that it is difficult to intentionally adjust the force with which the resin liner tightens the ball portion, that is, the pre-load.

DISCLOSURE OF THE INVENTION

The present invention has been made in view of the above problem. It is an object of the present invention to provide a spherical bearing manufacturing method which allows in a simple manner smooth rotation of the ball portion relative to the outside member after the casting and which makes it possible to completely eliminate the gap between the ball portion and the resin liner, making it possible to maintain a satisfactory slide contact between the ball portion and the resin liner for a long period of time.

To achieve the above object, the present invention provides a spherical bearing manufacturing method in which a metal ball portion constituting the inside member is inserted into a mold as a core before performing injection molding to form a resin liner covering the ball portion. This resin liner is molded by using the ball portion as the core, so that no gap exists between the resin liner and the spherical surface of the ball portion, and the spherical surface of the ball portion is transferred as it is to the resin liner. Thus, by using a bearing steel ball of high sphericity as the ball portion, it is possible to form a satisfactory mirror-surface-like slide surface on the resin liner, making it possible to bring this slide surface into close contact with the ball portion. Further, by molding the resin liner so as to cover the equator of the ball portion, it is possible to prevent the resin liner after molding from being separated from the ball portion. Accordingly it is possible to hand the ball portion and the resin liner as an integral unit in the subsequent manufacturing processes.

Next, the ball portion with the resin liner attached thereto is inserted into the mold as a core, and the outside member covering the resin liner from outside is cast. From the viewpoint of enhancing the dimensional accuracy of the spherical bearing manufactured, the casting is preferably squeeze casting; further, from the viewpoint of mass production, die-casting, which allows setting of the cycle time short, is preferable. Examples of the alloy that can be used for casting include zinc alloy, aluminum alloy, magnesium alloy, and titanium alloy; in the case of a spherical bearing used in a leg part such as an automotive suspension structure, it is desirable to use an aluminum alloy, magnesium alloy, etc. from the viewpoint of a reduction in weight.

After the outside member is thus cast, the resin liner tightens the ball portion, and it is difficult for the ball portion to freely rotate relative to the resin liner. That is, since the resin liner is attached to the ball portion by injection molding using the ball portion as a core, the resin liner tightens the ball portion due to contraction occurring after the injection molding; further, since the outside member also undergoes casting contraction after the casting, the outside member tightens the resin liner toward the ball portion, with the result that the ball portion is excessively in press contact with the resin liner. Thus, after the casting of the outside member, rotation of the ball portion relative to the resin liner is hindered.

Thus, in the method of the present invention, after the casting of the outside member, the resin liner covering the ball portion is heated through the ball portion of the inside member. The resin liner encloses and is in close contact with the ball portion, so that, when the ball portion is heated, the heat energy is conducted to the resin liner, and the resin liner is also heated to some degree. When, at this time, the resin liner undergoes temperature rise, and is heated to a temperature near the glass transition temperature Tg, the mechanical strength of the resin liner, such as the bending modulus, is gradually reduced, so that the resin liner becomes easily deformable in conformity with the size of the ball portion; when the resin liner is cooled after this heating, the tightening force of the resin liner with respect to the ball portion is reduced. Further, since the heated ball portion expands, it also occurs that the ball portion expands the resin liner, which also contributes to the tendency of the tightening force of the resin liner to be reduced after the cooling of the ball portion.

Accordingly, by thus heating the resin liner through the ball portion after the casting of the outside member, it is possible to mitigate the force with which the resin liner tightens the ball portion, enabling the ball portion to smoothly rotate relative to the resin liner. Thus, in this method, the ball portion becomes rotatable relative to the resin liner. However, since no gap is formed between the two, it is possible to completely eliminate rattling of the ball portion with respect to the outside member, thus making it possible to effect transmission of load and transmission of motion with high accuracy between the outside member and the inside member even in the case of a long-term use. Further, since it is possible to realize smooth rotation of the ball portion solely by heating the ball portion after the casting of the outside member, the method can be executed very easily, making it possible to easily cope with automation of each manufacturing process and mass production.

While, in heating the resin liner through the ball portion in the final process, it is only necessary to heat the ball portion, it is also possible to apply an external force to the ball portion, crushing the ball portion within an elastic deformation range. By thus pressurizing the ball portion simultaneously with the heating of the resin liner and crushing the ball portion, the elastically deformed ball acts so as to pressurize the resin liner toward the outside member, so that the effect of expanding the resin liner is enhanced, making it possible to more effectively reduce the force with which the ball portion is tightened by the resin liner.

Examples of the material of the resin liner that can be used in the method of the present invention include polyether ether ketone, polyether ketone, polyimide, polyamide imide, polyether imide, polyether ketone ketone, polyketone, polyether sulfone, liquid crystal polymer, polyallyl ether ketone, polyphenylene sulfide, fluororesin, and polyamide. Further, the resin liner heating temperature in the final process is determined by the relationship between it and the selected material; from the viewpoint of removing the force with which the ball portion is tightened by the resin liner, it is desirable to heat the resin liner to a temperature in excess of the glass transition temperature of the selected material.

Further, regarding the method of heating the resin liner through the ball portion, it is possible to provide a process for heating the ball portion additionally after the casting of the outside member; when, for example, the inside member is to be completed by bonding a shank to the ball portion after the casting of the outside member, the shank may be bonded to the ball portion by electric resistance welding, and the resin liner may be heated by utilizing the heat generation at the time of welding as it is, thus executing the removal of the tightening force for the resin liner and the bonding of the shank to the ball portion through a single process.

BRIEF DESCRIPTION OF THE DRAWINGS

FIG. 7(b) is a diagram showing the tightening force acting on the ball portion after the casting of the holder.

FIG. 7(c) is a diagram showing the step of removing the tightening force.

DESCRIPTION OF THE REFERENCE NUMERALS

1 . . . ball shank (inside member), 2 . . . holder (outside member), 3 . . . resin liner, 10 . . . ball portion, 20 . . . ball support portion

BEST MODE FOR CARRYING OUT THE INVENTION

In the following, the spherical bearing of the present invention will be described in detail with reference to the accompanying drawings.

Figure 1:
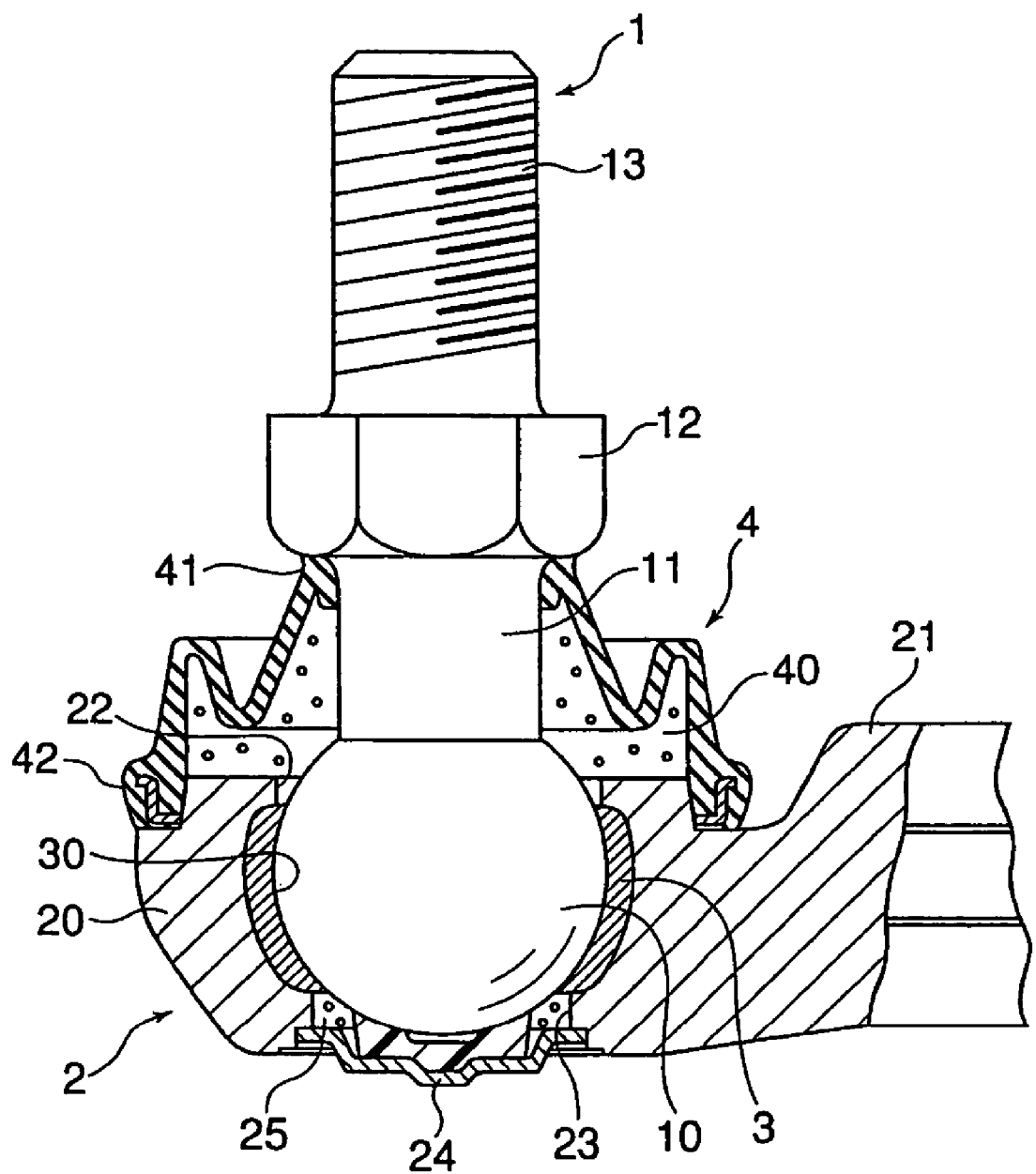
FIG. 1 is a front sectional view of a spherical bearing according to a first embodiment manufactured by the method of the present invention.

FIG. 1 shows a spherical bearing according to the first embodiment to which the present invention is applied. This spherical bearing is composed of a ball shank 1 constituting an inside member with a ball portion at the distal end thereof, and a holder 2 constituting an outside member having a ball support portion 20 enclosing a ball portion 10 of the ball shank 1, with the ball shank 1 and the holder 2 being connected to each other swingably or rotatably.

The ball shank 1 is formed by welding a bar-like shank 11 to a bearing steel ball of high sphericity constituting the ball portion 10, and at the bottom of the shank 11, there is formed a hexagonal bearing surface 12 for securing a member to be mounted such as a link. Further, a male screw 13 is formed on the distal end portion of the shank 11, and by threadedly engaging a nut with this male screw 13, the member to be mounted can be held and secured between the nut and the hexagonal bearing surface 12.

On the other hand, the holder 2 is equipped with the ball support portion 20 enclosing and holding the ball portion 10 of the ball shank 1, and a fixing portion 21 for connecting the ball support portion 20 to the link. The ball support portion 20 and the fixing portion 21 are formed integrally by die-casting of aluminum alloy or zinc alloy. An annular resin liner 3 is embedded in the ball support portion 20 so as to enclose and hold the spherical surface of the ball portion 10, and the ball portion 10 of the ball shank 1 is in contact with the resin liner 3 alone. The resin liner 3 has a thickness of approximately 1 mm, and covers approximately ⅔ of the spherical surface of the ball portion 10 including the equator, and in the inner side of the resin liner 3, there is formed a concave-spherical slide contact surface 30 substantially in conformity with the spherical surface of the ball portion 10. As a result, the ball shank 1 can freely swing or rotate relative to the holder 2 using the ball portion 10 as the swinging center. Although omitted in FIG. 1, a female screw is formed in the fixing portion 21, allowing connection, for example, with a male screw formed at the distal end of a rod or the like constituting the link.

Further, in the ball support portion 20 of the holder 2, there are formed a pair of openings 22, 23 exposing the ball portion 10 in opposite directions; the shank 11 is bonded to the ball portion 10 through one opening 22, whereas a cover member 24 is mounted to the other opening 23, and the inner side of the cover member 24 constitutes an oil sump 25. Between the peripheral edges of the openings 22, 23 and the ball portion 10, there is exposed a part of the resin liner 3, and the alloy forming the ball support portion 20 is not in direct contact with the ball portion 10. Further, the peripheral edges of the openings 22, 23 overlap the end surfaces of the resin liner 3, and the ball support portion 20 firmly holds the resin liner 3.

The inner diameter of each of the openings 22, 23 formed in the ball support portion 20 of the holder 2 is slightly smaller than the diameter of the ball portion 10 of the ball shank 1. As stated above, the resin liner 3 covers approximately ⅔ of the spherical surface of the ball portion 10 including the equator, and the resin liner 3 is held by the ball support portion 20, so that there ought to be no danger of the ball portion 10 being detached from the ball support portion 20 of the holder 2. However, when an excessive axial load is applied to the ball shank 1, it is to be imagined that the resin liner 3 is crushed, allowing the ball portion 10 to be detached from the ball support portion 20. In view of this, in order that the ball portion 10 may not be detached from the ball support portion 20 even if the resin liner 3 is crushed, the inner diameter of each of the openings 22, 23 is made slightly smaller than the diameter of the ball portion 10.

Further, between the outer peripheral edge of the holder 2 and the shank 11 of the ball shank 1, there is mounted a boot seal 4, preventing intrusion of dust, dirt, etc. into the gap between the ball portion 10 of the ball shank 1 and the ball support portion 20 of the holder 2; further, there is formed a seal pocket 40 accommodating lubricant such as grease. Here, a ball shank 1 side end portion 41 of the boot seal 4 is in close contact with the shank 11 due to its elasticity, and a holder 2 side end portion 42 thereof is held between the outer peripheral edge of the holder 2 and a lock ring, so that the boot seal 4 is not detached by swinging or rotating movement of the ball shank 1.

Next, a method of manufacturing the spherical bearing according to this embodiment will be specifically described.

Figure 2:
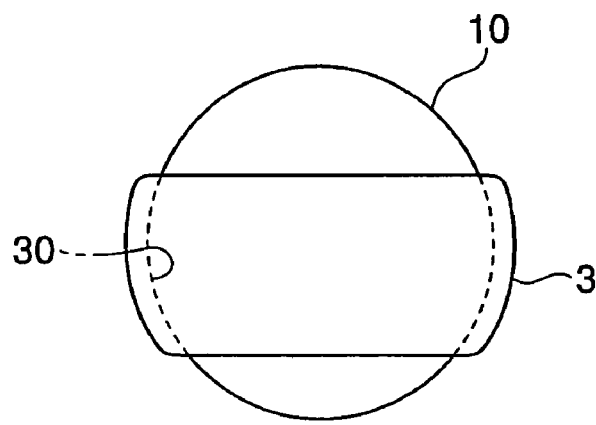
FIG. 2 is a front view of a ball portion with a resin liner attached thereto in the method of manufacturing a spherical bearing according to the first embodiment.

The holder 2 of the spherical bearing of this embodiment is manufactured by a die-casting process in which the ball portion 10 of the ball shank 1 is inserted into the casting mold as a core. Thus, in embedding the resin liner 3 in the ball support portion 20, it is necessary, first, to attach the resin liner 3 to the bearing steel ball constituting the ball portion 10. FIG. 2 is a front view of the resin liner 3 as attached to the steel ball. The resin liner 3 is formed as a ring having an inner diameter in conformity with the outer diameter of the ball portion 10, and is attached to the ball portion 10 so as to cover the equator of the ball portion 10. As the material of the resin liner 3, there is used a polyether ether ketone exhibiting a glass transition temperature of 151° C. and a melting point of 343° C. (manufactured by Victrex under the trade name of PEEK) and is formed in a thickness of approximately 1.0 mm.

The resin liner 3 is produced by injection molding, in which the ball portion 10 is inserted into a mold as a core, and is attached as it is to the ball portion. That is, injection molding of synthetic resin is effected, with the steel ball constituting the ball portion 10 being inserted into the mold, thus performing the molding of the resin liner 3 and the attachment thereof to the ball portion 10 by a single process. By thus molding the resin liner 3, the work of attachment to the ball portion 10 can be saved; further, the inner peripheral surface of the resin liner 3 is substantially in conformity with the spherical surface of the ball portion 10, making it possible to reliably attach the resin liner 3 relative to the ball portion 10.

Figure 3:
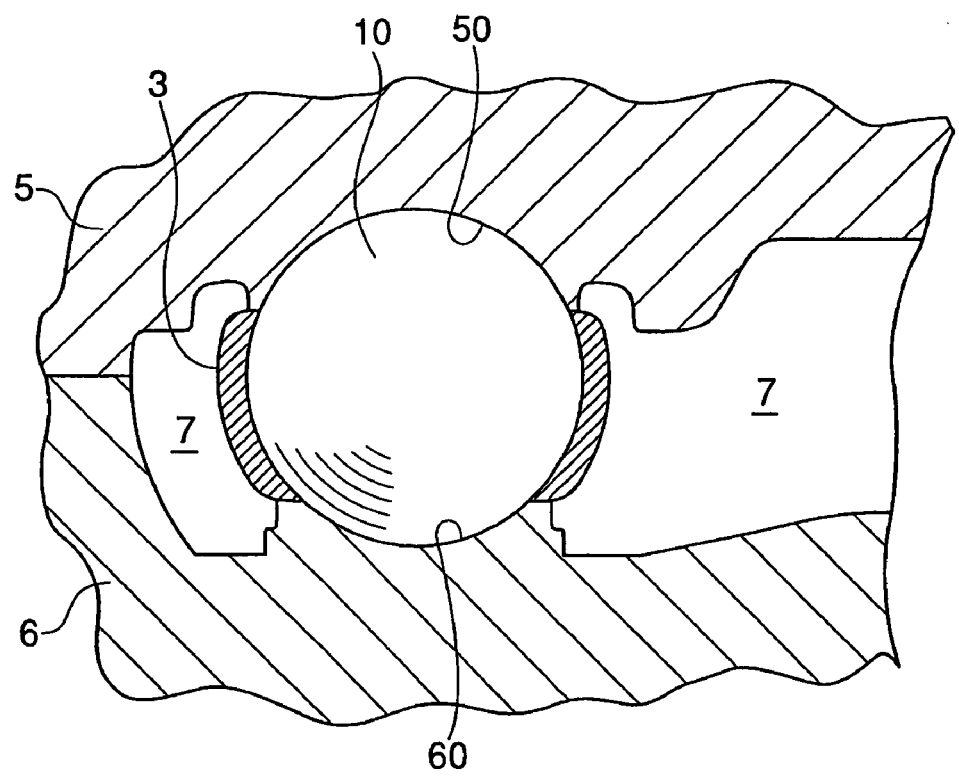
FIG. 3 is a sectional view showing how a holder is cast by using the ball portion as a core in the method of manufacturing a spherical bearing according to the first embodiment.

Next, the holder 2 is die-cast. As shown in FIG. 3, in this die-casting, the ball portion 10 with the resin liner 3 attached thereto in the foregoing process is inserted as a core into a mold divided into upper and lower molds 5, 6, and in this state, molten aluminum alloy or molten zinc alloy is forced into a cavity 7 in the mold. At this time, the inserted ball portion 10 is held between cylindrical support seats 50, 60 formed in the molds 5, 6, whereby positional deviation in the mold is prevented. Further, the support seats 50, 60 hold from above and below not only the ball portion 10 but also the resin liner 3, whereby the resin liner 3 is secured in position in the cavity 7 while attached to the ball portion 10, and is covered with the alloy poured into the cavity 7 except for the inner peripheral surface thereof in contact with the ball portion 10.

Figure 4:
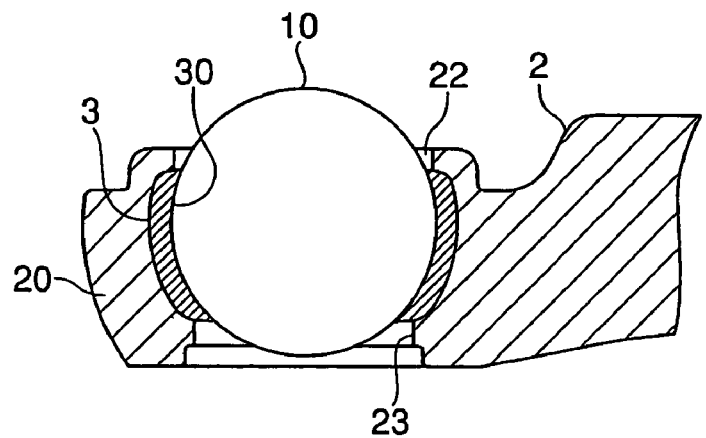
FIG. 4 is a front sectional view of the holder cast in the method of manufacturing a spherical bearing according to the first embodiment.

As a result, as shown in FIG. 4, the holder 2 with the ball portion 10 enclosed by the alloy is cast. At the positions of the cast holder 2 corresponding to the support seats 50, 60 of the molds 5, 6, there are formed the openings 22, 23, and the ball portion 10 is exposed solely through the openings 22, 23. Further, the resin liner 3, which has been attached to the ball portion 10, is embedded to the cast ball support portion 20, and is firmly fixed to the ball support portion 20. Since the resin liner was held from above and below by the support seats 50, 60 of the molds 5, 6, the die-cast ball support portion 20 is not in contact with the ball portion 10. Further, the die-cast ball support portion 20 overlaps a part of the end surfaces of the resin liner 3, and the ball support portion 20 holds the resin liner 3. As a result, the resin liner 3 is firmly integrated with the ball support portion 20.

The casting temperature when zinc alloy is used as the material of the holder 2 is not lower than 40° C., and the casting temperature when aluminum alloy is used is not lower than 600° C. Thus, these casting temperatures are much higher than the heat-resistant temperature of the resin liner 3, so that it is to be assumed that the resin liner 3, which is as thin as approximately 1 mm, would be carbonized during the casting of the holder 2 under normal circumstances. However, in a manufacturing process using such die-casting method, the ball portion 10 has a heat capacity much larger than that of the resin liner 3, so that the ball portion 10 serves to take the heat energy entering the resin liner 3 from the molten casting alloy, thus preventing carbonization of the resin liner 3. Thus, while the outer peripheral side of the resin liner 3, which is in contact with the ball support portion 20, seizes up on the ball support portion 20, the inner peripheral side thereof, which is in contact with the ball portion 10, remains intact without undergoing carbonization and forms a slide surface facing the ball portion 10. Further, in die-casting, molten casting alloy is quickly poured into the cavity 7 under high pressure, and the cycle time from the pouring of the molten alloy to the extraction of the holder 2 is as short as 5 to 10 seconds. Thus, it is to be assumed that this also helps to prevent carbonization of the resin liner 5 during casting of the holder 2. However, from the viewpoint of reliably protecting the slide contact surface 30 facing the ball portion 10 of the resin liner 3, it is desirable to immediately water-cool the holder 2 extracted from the molds 5, 6 after die-casting, and to remove the residual heat in the holder 2 after the die-casting.

Figure 5:
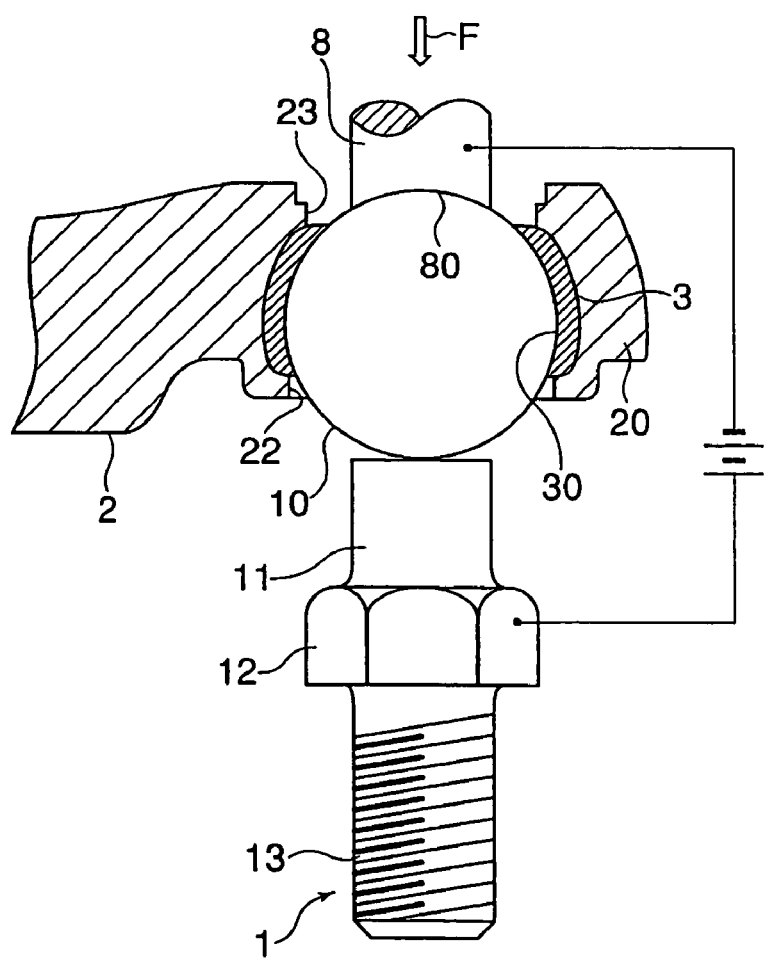
FIG. 5 is a front sectional view showing how a shank is welded to the ball portion enclosed in the holder in the method of manufacturing a spherical bearing according to the first embodiment.
Figure 6:
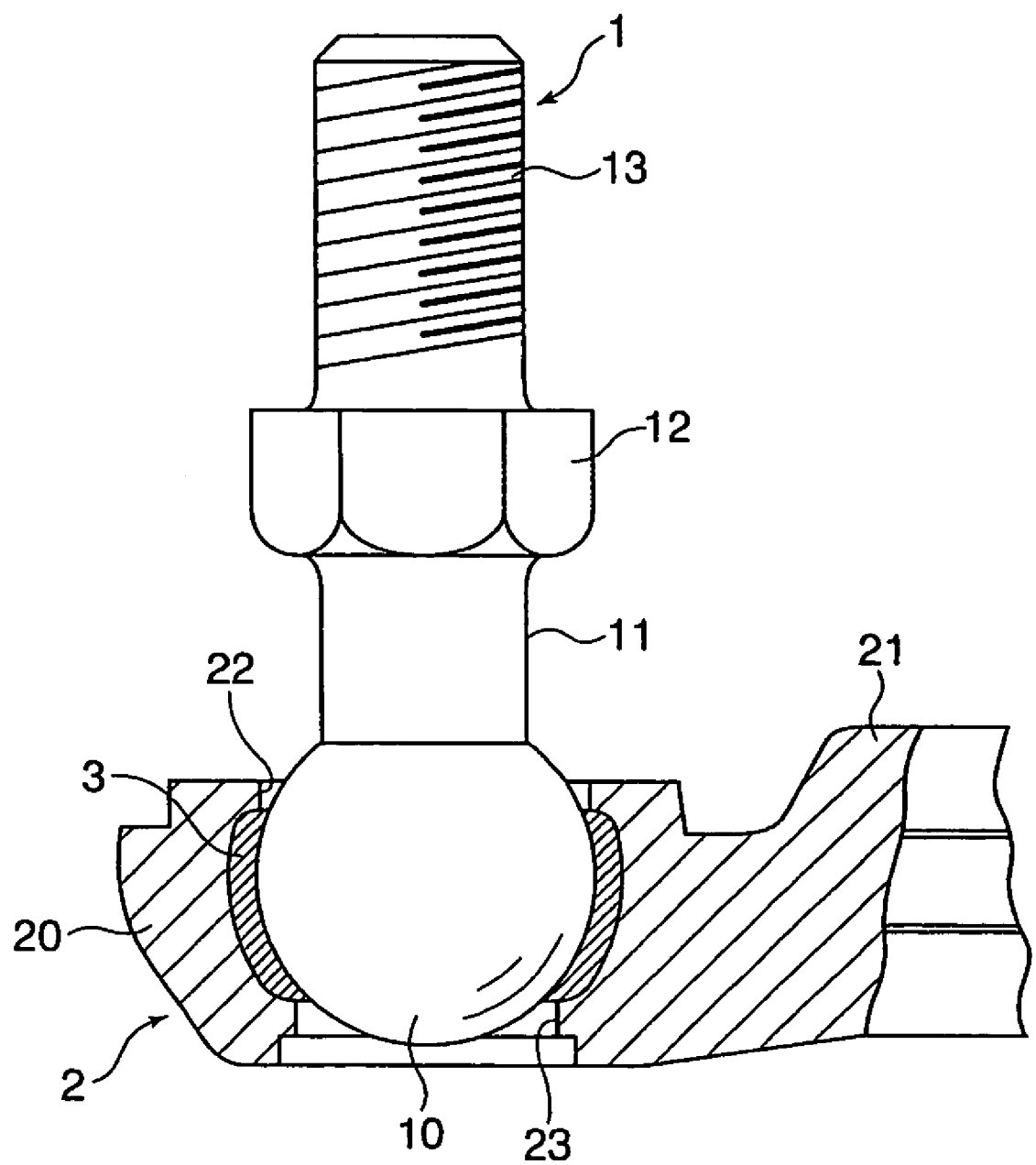
FIG. 6 is a front sectional view of a state after the welding of the shank to the ball portion in the method of manufacturing a spherical bearing according to the first embodiment.

Next, the shank 11 is welded to the ball portion 10 enclosed in the ball support portion 20 of the holder 2. For this welding, projection welding is adopted; as shown in FIG. 5, the end surface of the shank 11 is brought into press contact, with a predetermined force F, with the spherical surface of the ball portion 10 exposed through the opening 22 of the ball support portion 20, and at the same time, an electrode 8 is brought into contact with the spherical surface of the ball portion 10 exposed through the opening 23, and a welding current is supplied to the shank 11 and the electrode 8 for energization. When a large energization resistance exists between the electrode 8 and the ball portion 10, the portion of the ball portion 10 in contact with the electrode will be melted, so that the electrode 8 has a concave seat 80 in conformity with the spherical surface of the ball portion 10 for close face contact with the spherical surface of the ball portion 10. When the ball diameter is 15.875 mm and the shank distal portion diameter is 10 mm, the force F with which the shank 11 is pressed against the ball portion 10 is approximately 5880 N (600 kgf).

When this projection welding is completed, the ball shank 1 in which the ball portion 10 is enclosed in the ball support portion 20 of the holder 2 is completed.

Figure 7:
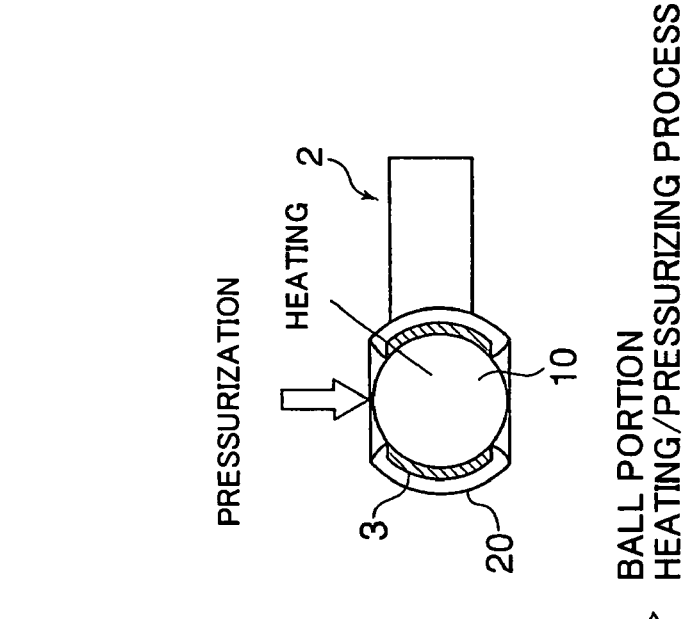
FIG. 7(*a*) is a diagram showing the tightening force acting on the ball after the injection molding of the resin liner.

The welding of the shank 11 to the ball portion 10 also provides the effect of removing the force with which the resin liner 3 tightens the ball portion 10. In the manufacturing method of the present invention, the resin liner 3 is first attached to the ball portion 10 by injection molding; after the completion of the injection molding, the resin liner 3 contracts, so that, as shown in FIG. 7(*a*), the ball is placed in a state in which it is tightened by the resin liner 3, with tensile stress acting on the resin liner along the spherical surface of the ball portion. Further, when the holder 2 is molded by die-casting, due to the contraction (casting contraction) after the casting, a state is attained in which, as shown in FIG. 7(*b*), the holder 2 tightens the ball portion 10 from the outer side of the resin liner 3. Thus, after the casting of the holder 2, the ball portion 10 is strongly tightened by the resin liner 3, and if this state is allowed to persist, it is impossible to rotate the ball portion 10 relative to the resin liner 3 and the ball support portion 20 of the holder 2, and even if the rotation is possible, the motion cannot but be very heavy.

However, as shown in FIG. 7(*c*), by heating the ball portion 10 after the casting of the holder 2, when the temperature of the resin liner 3, which is in contact with the ball portion 10, rises to a level not lower than the glass transition temperature Tg, the physical property values of the resin material itself forming the resin liner 3 start to change, and the bending modulus, shearing modulus, etc. gradually decrease, so that it is possible to deform the resin liner 3 in conformity with the size of the ball portion 10. At this time, the ball portion 10 itself undergoes thermal expansion, and its diameter becomes slightly larger than that at room temperature, so that the ball portion 10 bulges slightly to expand the resin liner 3. As a result, the force with which the resin liner 3 tightens the ball portion 10 is reduced or removed, enabling the ball portion 10 to rotate freely relative to the resin liner 3.

When welding the shank 11 to the ball portion 10, the welding portion is heated to a temperature of approximately 1200° C., and the resin liner 3, which is in contact with the ball portion 10, is also heated to a temperature not lower than the glass transition temperature Tg. Thus, when the shank 11 is welded to the ball portion 10 after the casting of the holder 2, the resin liner 3, which has been tightening the ball portion 10, undergoes deformation in conformity with the ball portion 10, making it possible to reduce or remove the force with which the resin liner 3 has been tightening the ball portion 10. That is, in the above-described manufacturing method, the shank 11 is welded to the ball portion 10, whereby the ball portion 10 can freely rotate relative to the resin liner 3 integrated with the ball support portion 20 of the holder 2.

At this time, although the ball portion 10 and the resin liner 3 are in close contact with each other, they are in an ideal contact state involving no generation of stress, so that the ball shank 1 can perform swinging motion around the ball portion 10 or rotating motion around the axis of the shank 11 very smoothly relative to the holder 2. Further, since the gap between the resin liner 3 and the ball portion 10 has been completely eliminated, the ball shank 1 does not rattle with respect to the holder 2, making it possible to sufficiently maintain the performance even in the case of a long-term use.

Further, in the step of projection-welding the shank 11 to the ball portion 10, the shank 11 is held in press contact with the ball portion 10 with a pressurizing force F, which also proves advantageous in reducing or removing the tightening force of the resin liner. That is, the ball portion 10 is slightly crushed by the pressurizing force F between the shank 11 and the electrode 8, and during the welding, the diameter thereof in the direction perpendicular to the pressurizing direction slightly increases. Thus, the ball portion 10 itself functions so as to press the resin liner 3, which is heated to a temperature not lower than the glass transition temperature Tg, against the ball support portion 20 of the holder 2, thus promoting the deformation of the resin liner 3. Thus, by pressurizing the ball portion 10 simultaneously with the heating of the ball portion 10, it is possible to more effectively reduce or remove the force with which the resin liner 3 tightens the ball portion 10, enabling the ball portion 10 to rotate freely relative to the resin liner 3, and by extension, enabling the ball shank 1 to swing smoothly relative to the holder 2.

Then, finally, the above-mentioned boot seal 4 is mounted between the shank 10 and the outer peripheral edge of the holder 2, and the seal pocket 40 formed by the boot seal 4 is filled with lubricant such as grease, whereby the spherical bearing of this embodiment is completed.

Such a spherical bearing of this invention was actually manufactured, and an endurance test was executed, in which the ball shank was caused to repeatedly swing relative to the holder. The diameter of the ball portion of the spherical bearing used is 19.05 mm, and the repetition frequency of the swinging movement is 13 Hz. In the conventional spherical bearing in which the holder is die-cast without embedding a resin liner (JP-A-62-288716), the ball support portion of the holder and the ball portion of the ball shank suffered seizure after the passage of one hour, whereas in the spherical bearing of the present invention, in which the ball portion is in slide contact with the resin liner alone, no gap was generated between the ball portion and the resin liner even after the passage of 216 hours (9 days), and the ball shank did not rattle with respect to the holder.

Figure 8:
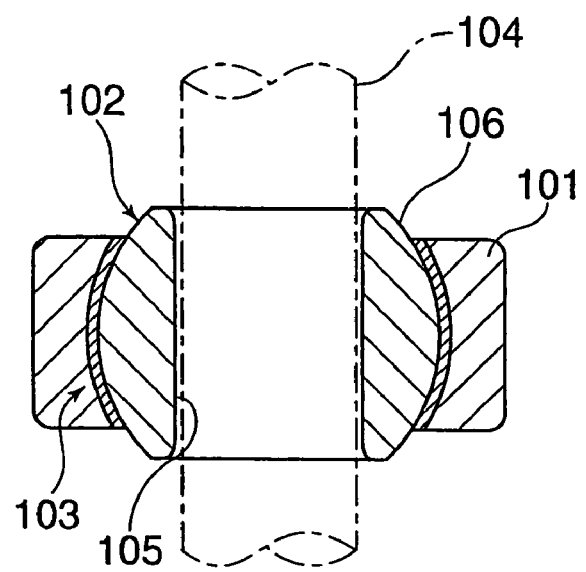
FIG. 8 is a front sectional view of a spherical bearing according to a second embodiment manufactured by the method of the present invention.

Next, FIG. 8 is a sectional view of a spherical bearing according the second embodiment manufactured by the method of the present invention.

This spherical bearing is composed of an outer ring 101 constituting the outside member, an inner ring 102 constituting the inside member, and a resin liner 103 provided between the inner ring 102 and the outer ring 101, in which the inner ring 102 can freely make a swinging movement or a rotating movement relative to the resin liner 103 held by the outer ring 101. The inner ring 102 is formed in an annular configuration with a through-hole 105 into which a rod 104 of a link mechanism is to be inserted, with its outer peripheral surface 106 being finished as a convex spherical surface in slide contact with the resin liner 103. As the material of the resin liner, the same polyether ether ketone as used in the first embodiment was used, and the thickness thereof was 1.0 mm.

The manufacturing method for the spherical bearing of the second embodiment is substantially the same as the manufacturing method for the spherical bearing of the first embodiment described above. First, the inner ring 102 is inserted in a mold as a core, and the resin liner 103 is formed by injection molding, attaching the resin liner 103 to the spherical surface 106 of the inner ring 102. Next, the inner ring 102 with the resin liner 103 attached thereto is inserted into the mold as a core, and in this state, molten aluminum alloy or molten zinc alloy is forced into the mold to die-cast the outer ring 101. As a result, there is cast the outer ring 101 of the alloy enclosing the inner ring 102. At this time, the outer peripheral surface of the resin liner 103, which has been attached to the inner ring 102, is firmly attached to the outer ring 101 by seizure, and is firmly integrated with the outer ring 101.

However, the resin liner 103 tightens the inner ring 102 from outside by contraction progressing after the injection molding; further, the outer ring 101 cast also tightens the resin liner 103 toward the inner ring 102 due to casting contraction, so that, in this state, it is impossible to rotate the inner ring 102 freely relative to the outer ring 101.

Figure 9:
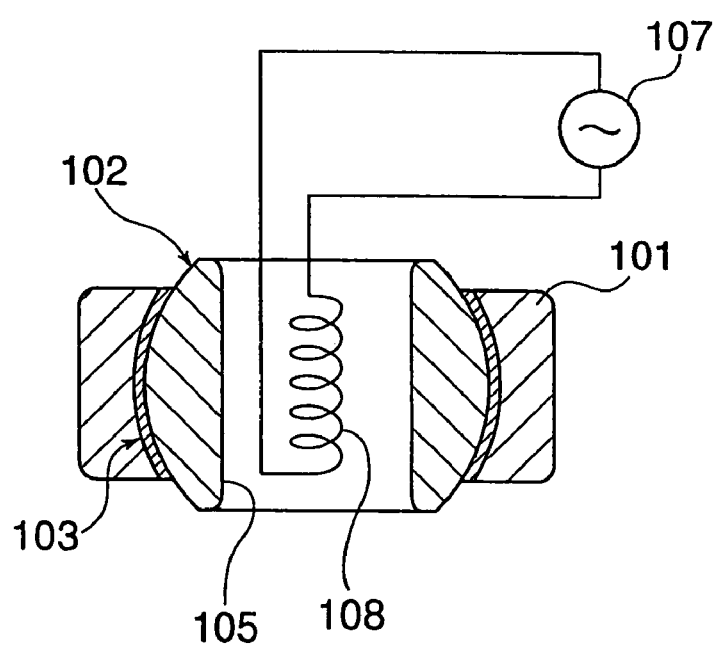
FIG. 9 is a front sectional view showing the step of heating the inner ring after the casting of the outer ring in the method of manufacturing a spherical bearing according to the second embodiment.

Thus, to reduce or remove the force with which the resin liner 103 tightens the inner ring 102, it is necessary, as in the manufacturing method of the first embodiment, to heat the resin liner 103 through the inner ring 102 after the casting of the outer ring 101. As shown in FIG. 9, in the spherical bearing of the second embodiment, a coil 108 connected to a high-frequency AC source 107 is inserted into the through-hole 105 of the inner ring 102, and the inner ring 102 is heated by high-frequency heating from the inside of the through-hole 105. The heating temperature for the inner ring is approximately 1500 to 1600° C., and the heating time is approximately 0.2 to 0.5 sec.

When the inner ring 102 is thus heated, the resin liner 103 in contact with the inner ring 102 is also heated to a temperature not lower than the glass transition temperature Tg, so that the resin liner 103, which has been tightening the inner ring 102 until then, undergoes deformation in conformity with the inner ring 102, and it is possible to reduce or remove the force with which the resin liner 103 has been tightening the inner ring 102. As a result, the inner ring 102 can freely rotate relative to the resin liner 103 integrated with the outer ring 101, and the rod 104 fixed to the through-hole 105 of the inner ring 102 can make a swinging movement or a rotating movement around its own axis very smoothly with respect to the outer ring 101.

At this time, although the inner ring 102 and the resin liner 103 are in close contact with each other, they are in an ideal contact state involving no generation of stress; further, the gap between the resin liner 103 and the inner ring 102 has been completely eliminated, so that the inner ring 102 does not rattle with respect to the outer ring 101, making it possible to sufficiently maintain the performance even in the case of a long-term use.

As described above, in the spherical bearing of the present invention, the resin liner is attached to the ball portion of the inside member by injection molding, further the outside member is cast so as to cover this resin liner, and finally the resin liner covering the ball portion is heated through the ball portion constituting the inside member, whereby the force with which the resin liner tightens the ball portion is reduced or removed, making it possible to realize a smooth swinging movement or a rotating movement of the inside member with respect to the outside member; further, since no gap is formed between the ball portion and the resin liner, it is possible to completely eliminate rattling of the inside member with respect to the outside member. Accordingly, even in the case of a long-term use, it is possible to effect with high accuracy transmission of load and transmission of movement between the outside member and the inside member. Further, since it is possible to realize smooth rotation of the ball portion solely by heating the ball portion after the casting of the outside member, the present invention can be carried out very easily, making it possible to easily cope with automation of each manufacturing process and mass production.

The invention claimed is:

1. A method of manufacturing a spherical bearing comprising an inside member having a metal ball portion, and an outside member having a ball support portion enclosing and supporting the ball portion of the inside member and connected swingably or rotatably relative to the inside member, the method comprising the steps of:
    performing injection molding, with the ball portion of the inside member being inserted into a mold as a core, to mold a resin liner covering the ball portion;
    casting the outside member covering the resin liner by inserting the ball portion and the resin liner into the mold as a core, such that the outside member is not in contact with the ball portion; and
    heating the resin liner covering the ball portion through only the ball portion of the inside member after the completion of the casting wherein said heating step comprises bringing a shank into press contact with the ball portion, and connecting an electrode to the ball portion at a location opposite that of the shank, and projection-welding the shank and the ball portion, wherein the resin liner is heated with the heat of the welding.

2. A method of manufacturing a spherical bearing according to claim 1, wherein the temperature at which the resin liner is heated after the completion of the casting is not lower than a glass transition temperature Tg of the resin liner.

3. A method of manufacturing a spherical bearing according to claim 1, wherein at the same time as the resin liner covering the ball portion is heated during the projection-welding step the ball portion is pressurized by the press contact force of the shank to be elastically deformed, thereby pressurizing the resin liner toward the outside member.

* * * * *